(12) United States Patent
Ono et al.

(10) Patent No.: US 12,339,522 B2
(45) Date of Patent: Jun. 24, 2025

(54) INFORMATION INPUT DEVICE

(71) Applicant: Nippon Telegraph and Telephone Corporation, Tokyo (JP)

(72) Inventors: Kazuyoshi Ono, Tokyo (JP); Shin Toyota, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 270 days.

(21) Appl. No.: 18/002,536

(22) PCT Filed: Jun. 24, 2020

(86) PCT No.: PCT/JP2020/024779
§ 371 (c)(1),
(2) Date: Dec. 20, 2022

(87) PCT Pub. No.: WO2021/260829
PCT Pub. Date: Dec. 30, 2021

(65) Prior Publication Data
US 2023/0236441 A1    Jul. 27, 2023

(51) Int. Cl.
*G06F 3/01* (2006.01)
*G02C 1/00* (2006.01)
*G02C 11/00* (2006.01)

(52) U.S. Cl.
CPC ............ *G02C 11/10* (2013.01); *G02C 1/00* (2013.01); *G06F 3/011* (2013.01)

(58) Field of Classification Search
CPC ............ G02C 11/10; G02C 1/00; G06F 3/011
See application file for complete search history.

(56) References Cited

U.S. PATENT DOCUMENTS

2019/0346928 A1* 11/2019 Shahmohammadi ........................ H04B 13/005
2019/0369726 A1* 12/2019 Kang .................... A61B 5/389

FOREIGN PATENT DOCUMENTS

| CN | 110134249 A | 8/2019 |
| CN | 110198665 A | 9/2019 |
| JP | 2019017945 A | 2/2019 |

OTHER PUBLICATIONS

Biopac Systems, Inc., "Active Electrode: TSD150 Series", [Searched on May 22, 2020], (http://biopac-sys.jp/products/tsd150a/). As discussed in the specification.

(Continued)

*Primary Examiner* — Robert J Michaud
(74) *Attorney, Agent, or Firm* — Slater Matsil, LLP

(57) ABSTRACT

A first determination unit determines whether a movement of an eyelid or an eyebrow of a wearer has occurred, based on an electric signal measured by a first measurement electrode with a common electrode as a ground potential. A second determination unit determines whether a movement of a jaw of the wearer has occurred, based on an electric signal measured by a second measurement electrode with the common electrode as a ground potential. An output unit outputs a command due to operation of a spectacle frame by the wearer when the first determination unit determines that the movement of the eyelid or the eyebrow of the wearer has occurred and, at the same time, the second determination unit determines that the movement of the jaw of the wearer has occurred.

14 Claims, 4 Drawing Sheets

(56) References Cited

OTHER PUBLICATIONS

Ichikawa et al. "Development of Interface System using Electromyograms of Face Movements" 10th Forum on Information Technology, vol. 2, G-018, 2011, pp. 559-560. As discussed in the specification.
Konno et al., "Method for Multi-dimensional Operation Interface Using Eye Location Detection", Journal of the Institute of Image Information and Television Engineers, vol. 61, No. 4, 2007, pp. 518-525. As discussed in the specification.
Sagarifuji, "What is the Future of Eye Controlled Communication Devices for Individuals with Special Needs", CREACT Corp., Chapter 2, Special Feature B: Disability Aid and Visuals, Journal of the Institute of Image Information and Television Engineers, 2015, vol. 69, No. 6, pp. 530-534. As discussed in the specification.
Yamashita et al., "Propagation of the High Frequency Component Caused by the Impact on the Tooth," J Jpn Prosthodont Soc, vol. 43, 1999, pp. 489-494. As discussed in the specification.

\* cited by examiner

INFORMATION INPUT DEVICE

CROSS-REFERENCE TO RELATED APPLICATIONS

This application is a national phase entry of PCT Application No. PCT/JP2020/024779, filed on Jun. 24, 2020, which application is hereby incorporated herein by reference.

TECHNICAL FIELD

The present invention relates to an information input device configured to input information.

BACKGROUND

Eye gaze interfaces have been put to practical use as devices configured for individuals with severe congenital limb defects to input information into information processing devices such as a computer (NPL 1). Functions of pointing devices included in user interfaces ordinarily used by healthy people, such as a mouse, are required to access information usually used by healthy people. That is, to access information, operation of moving a pointer and a movement comparable to a click (click, press, drag, or drop) are required to be included as functions that operate a pointer or an icon displayed on a screen of a computer (NPL 2).

CITATION LIST

Non Patent Literature

NPL 1: Naoko Sagarifuji, "What is the Future of Eye Controlled Communication Devices for Individuals with Special Needs", Chapter 2, Special Feature B: Disability Aid and Visuals, Journal of the Institute of Image Information and Television Engineers, Vol. 69, No. 6, pp. 530-534, 2015.

NPL 2: Hidetoshi Konno, et al., "Method for Multidimensional Operation Interface Using Eye Location Detection", Journal of the Institute of Image Information and Television Engineers, Vol. 61, No. 4, pp. 518-525, 2007.

SUMMARY

Technical Problem

In known techniques, for example, an eye-tracker is used to achieve operation of moving a pointer by an eye gaze and a movement comparable to a click by blinking. However, in known techniques, a malfunction may occur in the pointing function due to an involuntary movement that is different from the user's intent. For example, when a user blinks despite the intention of the user, the device recognizes it as a movement comparable to a click. For this reason, the user needs to use the device with caution to avoid the involuntary movement. In known techniques, the user falls into a situation in such a manner that the user is forced to limit blinks that is against the user's intention during use of the device, and a burden of the user such as fatigue has been large.

Embodiments of the present invention are contrived to solve the above-described problem, and an object thereof is to enable information to be input in a natural form for the user with the burden of the user being reduced.

Means To Solve Problems

An information input device according to an aspect of embodiments of the present invention includes a spectacle frame, a first measurement electrode provided in at least one of a nose pad and a rim of the spectacle frame and configured to measure an electric signal caused by a movement of an eyelid or an eyebrow of a wearer, a second measurement electrode provided in a temple tip of the spectacle frame and configured to measure an electric signal caused by a movement of a jaw of the wearer, a first determination unit configured to determine whether the movement of the eyelid or the eyebrow of the wearer has occurred, based on the electric signal measured by the first measurement electrode, a second determination unit configured to determine whether the movement of the jaw of the wearer has occurred, based on the electric signal measured by the second measurement electrode, and an output unit configured to output a command due to operation of the spectacle frame by the wearer when the first determination unit determines that the movement of the eyelid or the eyebrow of the wearer has occurred and, at the same time, the second determination unit determines that the movement of the jaw of the wearer has occurred.

An information input device according to an aspect of embodiments of the present invention includes a spectacle frame, a first measurement electrode provided in at least one of a nose pad and a rim of the spectacle frame and configured to measure an electric signal caused by a movement of an eyelid or an eyebrow of a wearer, an acceleration sensor provided in a bridge of the spectacle frame and configured to measure vibration occurred on the spectacle frame, a first determination unit configured to determine whether the movement of the eyelid or the eyebrow of the wearer has occurred, based on the electric signal measured by the first measurement electrode, a third determination unit configured to determine whether a movement of a jaw of the wearer has occurred, based on the vibration measured by the acceleration sensor, and an output unit configured to output a command due to operation of the spectacle frame by the wearer when the first determination unit determines that the movement of the eyelid or the eyebrow of the wearer has occurred and, at the same time, the third determination unit determines that the movement of the jaw of the wearer has occurred.

Effects of Embodiments of the Invention

As described above, in accordance with aspects of embodiments of the present invention, the first determination unit determines whether the movement of the eyelid or the eyebrow of the wearer of the spectacle frame has occurred and the second determination unit determines whether the movement of the jaw of the wearer of the spectacle frame has occurred, and thus it is possible to input information in a natural form for the user with the burden of the user being reduced.

DETAILED DESCRIPTION OF ILLUSTRATIVE EMBODIMENTS

Hereinafter, an information input device according to embodiments of the present invention will be described.

First Embodiment

Figure 1A:
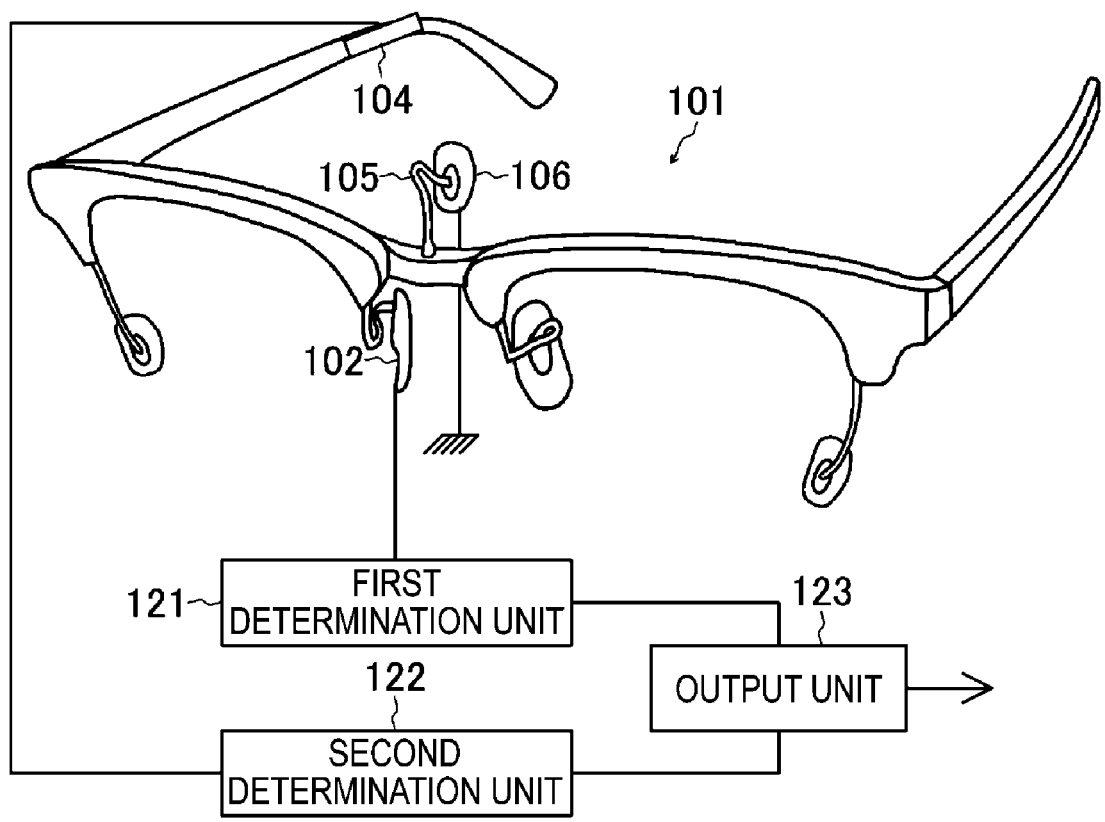
FIG. 1A is a configuration diagram illustrating a configuration of an information input device according to a first embodiment of the present invention.
Figure 1B:
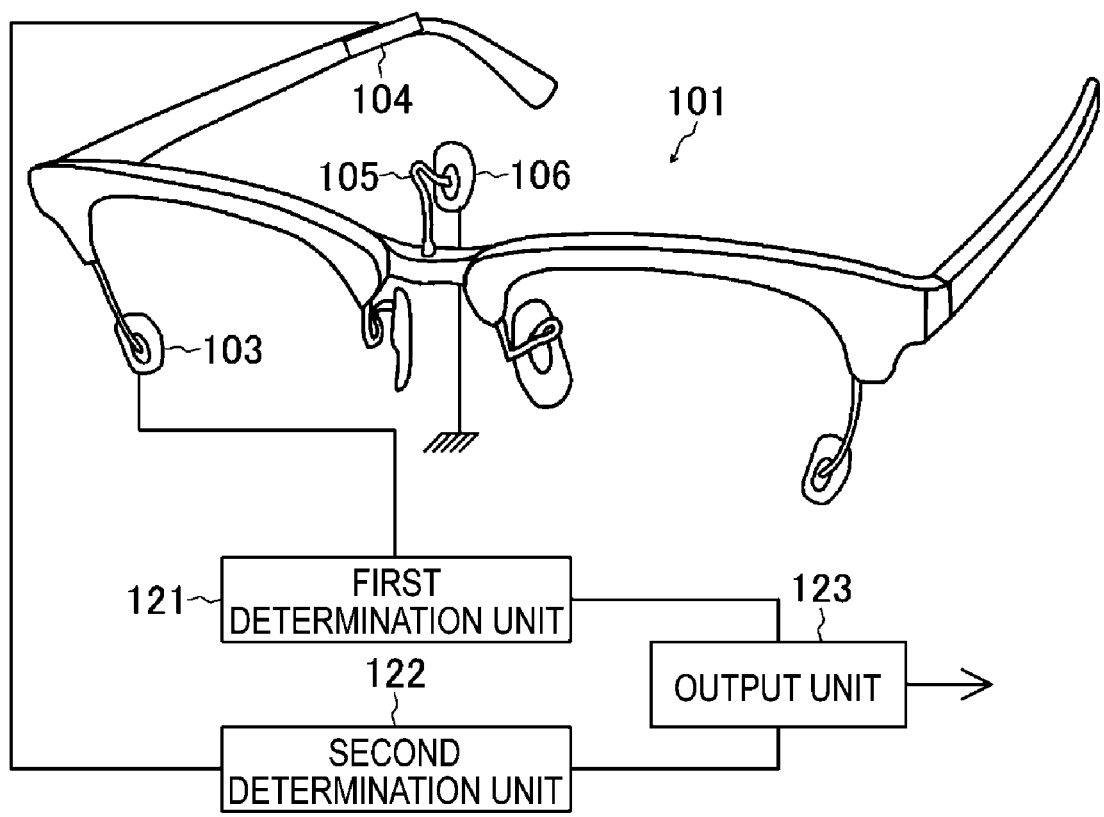
FIG. 1B is a configuration diagram illustrating a configuration of another information input device according to the first embodiment of the present invention.

First, an information input device according to a first embodiment of the present invention will be described with reference to FIGS. 1A and 1B. The information input device includes a spectacle frame 101, a first measurement electrode 102, a second measurement electrode 104, a first determination unit 121, a second determination unit 122, and an output unit 123. The information input device also includes an electrode fixing portion 105 formed in a bridge of the spectacle frame 101 and extending upward from the bridge, and a common electrode 106 fixed to the electrode fixing portion 105 and configured to contact skin of the wearer at a part in the electrode fixing portion 105.

The first measurement electrode 102 is provided in a nose pad of the spectacle frame 101 and used to measure an electric signal caused by a movement of an eyelid or an eyebrow of a wearer. The first measurement electrode 102 contacts skin of the wearer at a nose pad of the spectacle frame 101 and is used to measure potential of a part that is in contact with the skin. Alternatively, as illustrated in FIG. 1B, a first measurement electrode 103 can be provided on a rim of the spectacle frame 101. In this case, the first measurement electrode 103 contacts skin of the wearer at a rim of the spectacle frame 101 and is used to measure potential of a part that is in contact with the skin.

The second measurement electrode 104 is provided in a temple tip of the spectacle frame 101 and used to measure an electric signal caused by a movement of a jaw of the wearer. The second measurement electrode 104 contacts skin of the wearer at a temple tip of the spectacle frame 101 and is configured to measure potential of a part that is in contact with the skin.

The first determination unit 121 determines whether a movement of an eyelid or an eyebrow of a wearer has occurred, based on an electric signal measured by the first measurement electrode 102 with the common electrode 106 as a ground potential. The first determination unit 121 amplifies a potential signal obtained from the first measurement electrode 102, removes noise and the like from the amplified signal, extracts, for example, an eye electrograph signal, and compares the extracted eye electrograph signal with respect to a reference signal stored to determine whether the movement of the eyelid or the eyebrow of the wearer has occurred.

The second determination unit 122 determines whether a movement of a jaw of the wearer has occurred, based on an electric signal measured by the second measurement electrode 104 with the common electrode 106 as a ground potential. The second determination unit 122 amplifies a potential signal obtained from the second measurement electrode 104, removes noise and the like from the amplified signal, extracts, for example, a myoelectric potential signal, and compares the myoelectric potential signal with respect to a reference signal stored to determine whether the movement of the jaw of the wearer has occurred.

Here, the myoelectric signals of mimetic muscles differ in amplitude from movement to movement even for an identical test muscle, and thus feature extraction for each of the test muscles is important (see Reference 1). In the feature extraction, for example, a rectified and smoothed signal is obtained from a signal waveform measured and processed, a variation in time is obtained from the waveform of the rectified and smoothed signal obtained, and the feature extraction described above is performed.

Note that digitizing processing can be performed on the measured signal in each of the determination units. Additionally, adding or subtracting processing can be performed on the obtained signal in each of the determination units. Also, each of the determination units can perform management of identification of the wearer, as necessary.

The output unit 123 outputs a command due to operation of a spectacle frame 101 by the wearer when the first determination unit 121 determines that the movement of the eyelid or the eyebrow of the wearer has occurred and, at the same time, the second determination unit 122 determines that the movement of the jaw of the wearer has occurred. The output unit 123 also has a function to feed back presence of a signal being measured or a signal output and processed by an external device to the wearer by voice, vibration, or the like.

The output unit 123 can also transmit signals processed by each of the determination units to an external device such as a smartphone or a tablet terminal, or a personal computer. For example, the output unit 123 transmits each signal to an external device by a wireless communication, such as Bluetooth (trade name) or wireless LAN, or a wired communication. The output unit 123 may also include a function of receiving a signal processed and transmitted by an external device.

The determination units and the output unit 123 may include a computer device including, such as, a central processing unit (CPU), a main storage device, an external storage device, and a network connection device. The CPU operates (executes a program) by a program deployed in the main storage device, so that each of the functions described above can be achieved.

According to the first embodiment described above, two independent and different voluntary movements of the movement of the eyelid or the eyebrow of the wearer and the movement of the jaw of the wearer are measured, and a command such as activating the pointing function is output when these voluntary movements are measured (detected) at the same time. In this way, in a case where one of the gestures of the user becomes an involuntary movement, the device can be prevented from reacting not to cause malfunction. The muscles of the face connect the bones to the skin and can create complex facial expressions. On the other hand, multiple muscles of the face are associated with each other by two movements. Two different types of voluntary movements can be generated functional-anatomically independently and spontaneously by the wearer on such facial muscles and skeletal structures.

Second Embodiment

Figure 2:
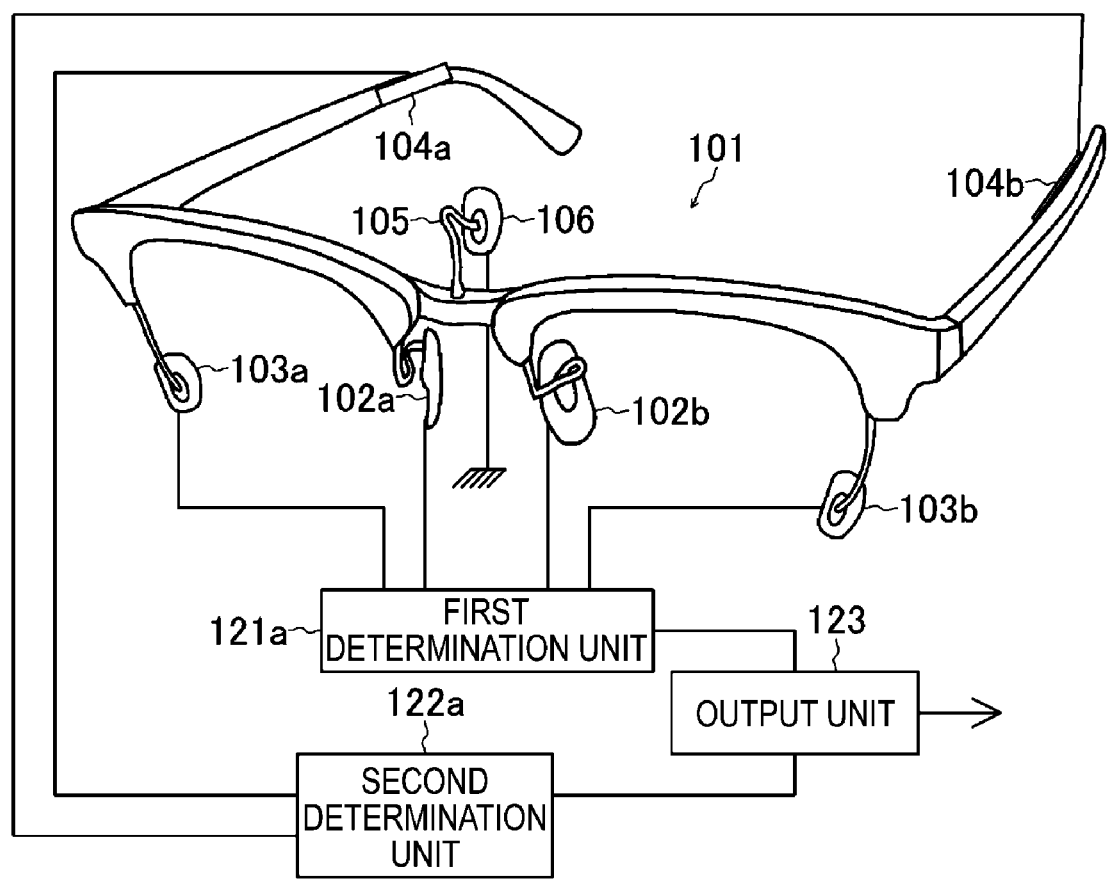
FIG. 2 is a configuration diagram illustrating a configuration of an information input device according to a second embodiment of the present invention.

Next, an information input device according to the second embodiment of the present invention will be described with reference to FIG. 2. The information input device includes a spectacle frame 101, a first nose pad electrode 102a, a second nose pad electrode 102b, a first rim electrode 103a, a second rim electrode 103b, a first temple tip electrode 104a, a second temple tip electrode 104b, a first determination unit 121a, a second determination unit 122a, and an output unit 123.

The first nose pad electrode iota and the second nose pad electrode 102b are provided in respective two nose pads of the spectacle frame 101 and each contact skin of the wearer at a part of the corresponding nose pad. The first rim electrode 103a and the second rim electrode 103b each contact skin of the wearer at a part of the corresponding rim. In the second embodiment, the first nose pad electrode iota, the second nose pad electrode 102b, the first rim electrode 103a, and the second rim electrode 103b configure a first measurement electrode. These electrodes are used to measure an electric signal caused by a movement of an eyelid or an eyebrow of the wearer.

The first temple tip electrode 104a and the second temple tip electrode 104b are provided in respective two temple tips of the spectacle frame 101 and each contact skin of the wearer at a part of the corresponding temple tip. In the second embodiment, the first temple tip electrode 104a and the second temple tip electrode 104b configure a second measurement electrode. The first temple tip electrode 104a and the second temple tip electrode 104b are used to measure an electric signal caused by a movement of a jaw of the wearer. Each of the electrodes described above can employ an active electrode (Reference 2).

The first determination unit 121a determines whether a movement of an eyelid or an eyebrow of a wearer has occurred, based on an electric signal measured by the first nose pad electrode 102a, the second nose pad electrode 102b, the first rim electrode 103a, and the second rim electrode 103b. The first determination unit 121 amplifies a potential signal obtained from each electrode in the first measurement electrode having the configuration described above. Then, the first determination unit 121 removes noise and the like from the amplified signal, extracts, for example, an eye electrograph signal, and compares the extracted eye electrograph signal with respect to a reference signal stored to determine whether the movement of the eyelid or the eyebrow of the wearer has occurred.

Specifically, the first determination unit 121 measures (detects) potential of mimetic muscles or ocular potential around the right eye by differential potential between the first nose pad electrode 102a and the first rim electrode 103a with the common electrode 106 as a ground potential. The first determination unit 121 also measures (detects) potential of mimetic muscles or ocular potential around the left eye by differential potential between the second nose pad electrode 102b and the second rim electrode 103b with the common electrode 106 as a ground potential. The first determination unit 121 can also detect potential of mimetic muscles or oculus potential by differential potential between the first nose pad electrode iota and the second nose pad electrode 102b or differential potential between the first rim electrode 103a and the second rim electrode 103b with the common electrode 106 as a ground potential.

The second determination unit 122a determines whether a movement of a jaw of the wearer has occurred, based on an electric signal measured by the first temple tip electrode 104a and the second temple tip electrode 104b. The second determination unit 122 amplifies a potential signal obtained from each electrode in the second measurement electrode having the configuration described above, removes noise and the like from the amplified signal, extracts, for example, a myoelectric potential signal, and compares the extracted myoelectric potential signal with respect to a reference signal stored to determine whether the movement of the jaw of the wearer has occurred.

Specifically, the second determination unit 122a measures (detects) myogenic potential of the temporal muscle, the masseter muscle, and the lateral pterygoid muscle by differential potential between the first temple tip electrode 104a and the second temple tip electrode 104b with the common electrode 106 as a ground potential. Note that the second determination unit 122a can also measure (detect) myogenic potential of the temporal muscle, the masseter muscle, and the lateral pterygoid muscle by differential potential between the first temple tip electrode 104a and the second temple tip electrode 104b with the first nose pad electrode 102a or the second nose pad electrode 102b as a ground potential.

The output unit 123 outputs a command due to operation of a spectacle frame 101 by the wearer when the first determination unit 121 determines that the movement of the eyelid or the eyebrow of the wearer has occurred and, at the same time, the second determination unit 122 determines that the movement of the jaw of the wearer has occurred. The output unit 123 also has a function to feed back presence of a signal being measured or a signal output and processed by an external device to the wearer by voice, vibration, or the like.

In the second embodiment described above as well, two independent and different voluntary movements of the movement of the eyelid or the eyebrow of the wearer and the movement of the jaw of the wearer are measured, and a command such as activating the pointing function is output when these voluntary movements are measured (detected) at the same time. In this way, in a case where one of the gestures of the user becomes an involuntary movement, the device can be prevented from reacting not to cause malfunction.

Third Embodiment

Figure 3:
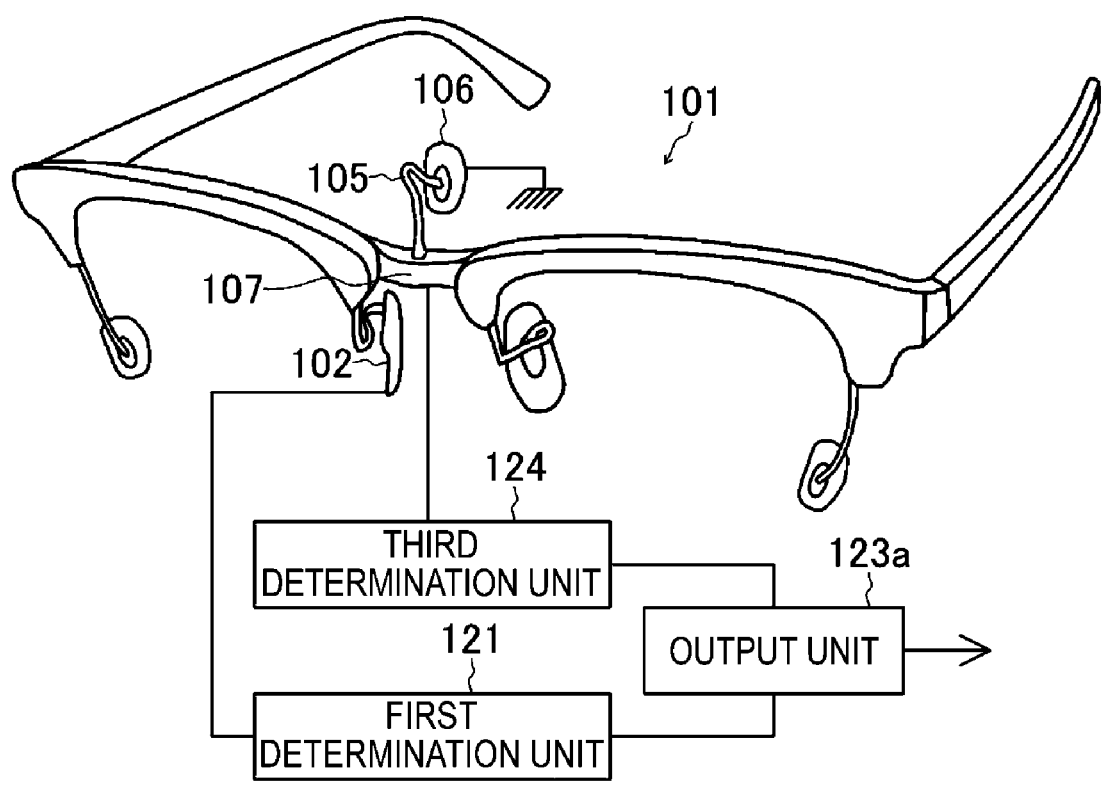
FIG. 3 is a configuration diagram illustrating a configuration of an information input device according to a third embodiment of the present invention.

Next, an information input device according to the third embodiment of the present invention will be described with reference to FIG. 3. The information input device includes a spectacle frame 101, a first measurement electrode 102, a first determination unit 121, a third determination unit 124, an acceleration sensor 107, and an output unit 123a. The information input device also includes an electrode fixing portion 105 formed in a bridge of the spectacle frame 101 and extending upward from the bridge, and a common electrode 106 fixed to the electrode fixing portion 105 and configured to contact skin of the wearer at a part in the electrode fixing portion 105. The spectacle frame 101, the first measurement electrode 102, the first determination unit 121, the electrode fixing portion 105, and the common electrode 106 are similar to those of the first embodiment described above, and the detailed description thereof is omitted.

The acceleration sensor 107 is provided in the bridge of the spectacle frame 101, and measures vibration generated in the spectacle frame 101. The third determination unit 124 determines whether a movement of a jaw of the wearer has occurred, based on the vibration measured by the acceleration sensor 107. For example, the third determination unit 124 detects impact of a tooth at the time of bite by performing frequency analysis of the signal measured by the acceleration sensor 107 and extracting high-frequency components when teeth collide (Reference 3).

Note that digitizing processing can be performed on the measured signal in the third determination unit 124. Additionally, adding or subtracting processing can be performed on the obtained signal in the third determination unit 124. Also, the third determination unit 124 can perform management of identification of the wearer, as necessary.

The output unit 123a outputs a command due to operation of a spectacle frame 101 by the wearer when the first determination unit 121 determines that the movement of the eyelid or the eyebrow of the wearer has occurred and, at the same time, the third determination unit 124 determines that the movement of the jaw of the wearer has occurred. The output unit 123*a* also has a function to feed back presence of a signal being measured or a signal output and processed by an external device to the wearer by voice, vibration, or the like.

According to the third embodiment described above, two independent and different voluntary movements of the movement of the eyelid or the eyebrow of the wearer and the movement of the jaw of the wearer are measured, and a command such as activating the pointing function is output when these voluntary movements are measured (detected) at the same time. In this way, in a case where one of the gestures of the user becomes an involuntary movement, the device can be prevented from reacting not to cause malfunction.

As described above, in accordance with aspects of embodiments of the present invention, the first determination unit determines whether the movement of the eyelid or the eyebrow of the wearer of the spectacle frame has occurred and the second determination unit determines whether the movement of the jaw of the wearer of the spectacle frame has occurred, and thus it is possible to input information in a natural form for the user with the burden of the user being reduced.

Meanwhile, the present invention is not limited to the embodiments described above, and it will be obvious to those skilled in the art that various modifications and combinations can be implemented within the technical idea of the present invention. For example, the first nose pad electrode, the second nose pad electrode, the first rim electrode, and the second rim electrode in the configuration of the second embodiment can be combined with the configuration of the third embodiment.

Reference 1: Kaoru Ichikawa and Junichi Hori, "Development of Interface System using Electromyograms of Face Movements" loth Forum on Information Technology, Vol. 2, G-018, pp. 559-560, 2011.

Reference 2: BIOPAC SYSTEMS, Inc., "Active Electrode: TSD150 Series", [Searched on May 22, 2020], (http://biopac-sys.jp/products/tsd150a/).

Reference 3: Rika Yamashita, et al., "Propagation of the High Frequency Component Caused by the Impact on the Tooth", Journal of Prosthodontic Research, Vol. 43, pp. 489-494, 1999.

REFERENCE SIGNS LIST

101 Spectacle frame
102 First measurement electrode
103 First measurement electrode
104 Second measurement electrode
105 Electrode fixing portion
106 Common electrode
121 First determination unit
122 Second determination unit
123 Output unit.

The invention claimed is:

1. An information input device comprising:
a spectacle frame including a nose pad, a rim, and a temple tip;
a first measurement electrode in the nose pad or the rim of the spectacle frame, the first measurement electrode being configured to measure a first electric signal caused by a movement of an eyelid or an eyebrow of a wearer of the spectacle frame;
a second measurement electrode provided in the temple tip of the spectacle frame, the second measurement electrode being configured to measure a second electric signal caused by a movement of a jaw of the wearer;
a first determination circuit configured to determine whether the movement of the eyelid or the eyebrow of the wearer has occurred, based on the first electric signal;
a second determination circuit configured to determine whether the movement of the jaw of the wearer has occurred, based on the second electric signal; and
an output circuit configured to output a command due to operation of the spectacle frame by the wearer when the first determination circuit determines that the movement of the eyelid or the eyebrow of the wearer has occurred concurrently with the second determination circuit determining that the movement of the jaw of the wearer has occurred,
wherein:
the spectacle frame further includes a bridge; and
the information input device further includes:
an electrode fixing portion in the bridge of the spectacle frame and extending upward from the bridge; and
a common electrode fixed to the electrode fixing portion and configured to come into contact with skin of the wearer.

2. The information input device according to claim 1, wherein:
the temple tip includes a first temple tip and a second temple tip; and
the second measurement electrode includes a first temple tip electrode and a second temple tip electrode provided in the first temple tip and the second temple tip, respectively, and
each of the first temple tip electrode and the second temple tip electrode being configured to come into contact with the skin of the wearer.

3. The information input device according to claim 1, wherein:
the nose pad includes a first nose pad and a second nose pad, and
the first measurement electrode includes a first nose pad electrode and a second nose pad electrode provided in the first nose pad and the second nose pad, respectively, and each of the first nose pad electrode and the second nose pad electrode being configured to come into contact with the skin of the wearer.

4. The information input device according to claim 1, wherein:
the rim includes a first binocular rim and a second binocular rim, and
the first measurement electrode includes a first rim electrode and a second rim electrode provided in the first binocular rim and the second binocular rim, respectively, and each of the first rim electrode and the second rim electrode being configured to come into contact with the skin of the wearer.

5. The information input device according to claim 1 wherein:
the nose pad includes a first nose pad and a second nose pad; and
the first measurement electrode includes a first nose pad electrode and a second nose pad electrode in the first nose pad and the second nose pad, respectively, and each of the first nose pad electrode and the second nose pad electrode being configured to come into contact with the skin of the wearer.

6. The information input device according to claim 1 wherein:
the rim includes a first binocular rim and a second binocular rim; and
the first measurement electrode includes a first rim electrode and a second rim electrode provided in the first binocular rim and the second binocular rim, respectively, and each of the first rim electrode and the second rim electrode being configured to come into contact with the skin of the wearer.

7. The information input device according to claim 1 further comprising:
the electrode fixing portion in the bridge of the spectacle frame and extending upward from the bridge; and
the common electrode fixed to the electrode fixing portion and configured to come into contact with the skin of the wearer.

8. An information input device comprising:
a spectacle frame including a nose pad, a rim, and a bridge;
a first measurement electrode provided in the nose pad or the rim of the spectacle frame,
the first measurement electrode being configured to measure a first electric signal caused by a movement of an eyelid or an eyebrow of a wearer of the spectacle frame;
an acceleration sensor provided in the bridge of the spectacle frame, the acceleration sensor being configured to measure vibration that occurred on the spectacle frame;
a first determination circuit configured to determine whether the movement of the eyelid or the eyebrow of the wearer has occurred, based on the first electric signal;
a second determination circuit configured to determine whether a movement of a jaw of the wearer has occurred, based on the vibration measured by the acceleration sensor; and
an output circuit configured to output a command due to operation of the spectacle frame by the wearer when the first determination circuit determines that the movement of the eyelid or the eyebrow of the wearer has occurred concurrently with the second determination circuit determining that the movement of the jaw of the wearer has occurred.

9. The information input device according to claim 8, wherein:
the nose pad includes a first nose pad and a second nose pad, and
the first measurement electrode includes a first nose pad electrode and a second nose pad electrode provided in the first nose pad and the second nose pad, respectively, and each of the first nose pad electrode and the second nose pad electrode being configured to come into contact with skin of the wearer.

10. The information input device according to claim 8, wherein:
the rim includes a first binocular rim and a second binocular rim, and
the first measurement electrode includes a first rim electrode and a second rim electrode provided in the first binocular rim and the second binocular rim, respectively, and each of the first rim electrode and the second rim electrode being configured to come into contact with skin of the wearer.

11. The information input device according to claim 8, wherein:
the spectacle frame further includes a bridge; and
the information input device further includes:
an electrode fixing portion in the bridge of the spectacle frame and extending upward from the bridge; and
a common electrode fixed to the electrode fixing portion and configured to come into contact with skin of the wearer.

12. The information input device according to claim 11, wherein:
the nose pad includes a first nose pad and a second nose pad; and
the first measurement electrode includes a first nose pad electrode and a second nose pad electrode in the first nose pad and the second nose pad, respectively, and each of the first nose pad electrode and the second nose pad electrode being configured to come into contact with the skin of the wearer.

13. The information input device according to claim 11, wherein:
the rim includes a first binocular rim and a second binocular rim; and
the first measurement electrode includes a first rim electrode and a second rim electrode provided in the first binocular rim and the second binocular rim, respectively, and each of the first rim electrode and the second rim electrode being configured to come into contact with the skin of the wearer.

14. The information input device according to claim 11, further comprising:
the electrode fixing portion in the bridge of the spectacle frame and extending upward from the bridge; and
the common electrode fixed to the electrode fixing portion and configured to come into contact with the skin of the wearer.

* * * * *